(12) United States Patent
Hi

(10) Patent No.: US 8,971,415 B2
(45) Date of Patent: Mar. 3, 2015

(54) VIDEO COMMUNICATION SYSTEM, DEVICE AND METHOD BASED ON FEEDBACK REFERENCE FRAMES

(75) Inventor: Jian Hi, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 866 days.

(21) Appl. No.: 12/966,473

(22) Filed: Dec. 13, 2010

(65) Prior Publication Data

US 2011/0085602 A1  Apr. 14, 2011

Related U.S. Application Data

(63) Continuation of application No. PCT/CN2009/074007, filed on Sep. 17, 2009.

(30) Foreign Application Priority Data

Sep. 24, 2008  (CN) .......................... 2008 1 0161276

(51) Int. Cl.
| | |
|---|---|
| *H04N 7/26* | (2006.01) |
| *H04N 19/103* | (2014.01) |
| *H04N 21/4425* | (2011.01) |
| *H04N 21/6379* | (2011.01) |

(Continued)

(52) U.S. Cl.
CPC ......... *H04N 19/103* (2013.01); *H04N 21/4425* (2013.01); *H04N 21/6379* (2013.01); *H04N 21/6583* (2013.01); *H04N 21/6587* (2013.01); *H04N 19/154* (2013.01); *H04N 19/166* (2013.01)
USPC .................................................... 375/240.25

(58) Field of Classification Search
None
See application file for complete search history.

(56) References Cited

U.S. PATENT DOCUMENTS

| 5,528,284 A | 6/1996 | Iwami et al. | |
|---|---|---|---|
| 5,896,394 A * | 4/1999 | Fukuda ........................ | 714/712 |

(Continued)

FOREIGN PATENT DOCUMENTS

| CN | 1168055 A | 12/1997 |
|---|---|---|
| CN | 1195236 A | 10/1998 |

(Continued)

OTHER PUBLICATIONS

International Search Report for PCT/CN2009/074007 dated Dec. 10, 2009.

*Primary Examiner* — Sath V Perungavoor
*Assistant Examiner* — Kate Luo
(74) *Attorney, Agent, or Firm* — Marshall, Gerstein & Borun LLP

(57) ABSTRACT

Embodiments of the invention provide a video communication system, device and method on the basis of feedback reference frame. The method includes: receiving, by a video encoding end, video frame information fed back by a video decoding end, determining a reference frame for encoding current video image according to the video frame information; encoding the current video image according to determined reference frame, and sending a video frame formed after the encoding; decoding, by the video decoding end, received video frame, and feeding back the video frame information to the video encoding end through a network and according to decoding result. By adopting embodiments of the invention, network data flow may be reduced. Meanwhile, phenomenon which may cause greater impact on the network, when it is necessary to send larger data amount since frame-loss or failed-decoding, may be avoided.

10 Claims, 5 Drawing Sheets

(51) Int. Cl.
*H04N 21/6583* (2011.01)
*H04N 21/6587* (2011.01)
*H04N 19/154* (2014.01)
*H04N 19/166* (2014.01)

(56) References Cited

U.S. PATENT DOCUMENTS

| | | | |
|---|---|---|---|
| 6,049,570 A | 4/2000 | Fukunaga et al. | |
| 6,169,821 B1 | 1/2001 | Fukunaga et al. | |
| 6,487,316 B1 * | 11/2002 | Fukunaga et al. | 382/239 |
| 6,621,868 B1 | 9/2003 | Kimata et al. | |
| 6,859,498 B1 | 2/2005 | Choi | |
| 2007/0211802 A1 * | 9/2007 | Kikuchi et al. | 375/240.16 |
| 2007/0245078 A1 * | 10/2007 | Kanota et al. | 711/112 |

FOREIGN PATENT DOCUMENTS

| | | |
|---|---|---|
| CN | 1307430 A | 8/2001 |
| CN | 1143544 C | 3/2004 |
| CN | 101207813 A | 6/2008 |
| CN | 101360243 A | 2/2009 |
| EP | 0940989 A2 | 9/1999 |

\* cited by examiner

VIDEO COMMUNICATION SYSTEM, DEVICE AND METHOD BASED ON FEEDBACK REFERENCE FRAMES

CROSS-REFERENCE TO RELATED APPLICATIONS

This is a continuation of PCT/CN2009/074007 filed Sep. 17, 2009, which claims the priority benefit under USC 119 of CN 200810161276.2 filed Sep. 24, 2008, the entire respective disclosures of which are incorporated herein by reference.

FIELD OF THE INVENTION

The present invention relates to video communication technologies, and more particularly, to a video communication system, device and method on the basis of feedback reference frame.

BACKGROUND OF THE INVENTION

With the development of video communication technologies and the improvement of network bandwidth, more and more users adopt video communication, such as network video playing, video chat, video conference and video-on-demand. Thus, life and work of societal public have been greatly enriched. Meanwhile, further development of the video communication technologies and network technologies are accelerated.

However, since the instability of network bandwidth and network transmission quality easily caused by complicated architecture and "best effort" characteristics of the Internet, video communication quality of current video communication system is difficult to be guaranteed under some circumstances, which has a serious influence on users' usage. One of primary bottlenecks affecting video communication quality currently is pause of video transmission caused by loss of network packets. FIG. 1 is a brief data flow diagram illustrating existed video communication technologies, in which video encoding end encodes video frames according to pre-defined rules and frame type, and then sends the encoded video frames to video decoding end through a network. The video decoding end decodes received video frames, and then plays the video.

However, according to currently widely applied technical solution, when network packets are lost in network congestion caused by a certain reason and video decoding end cannot restore decodable data with remaining data, it is necessary for the video encoding end to encode an Intra frame (I frame) with large data amount to be sent to the video decoding end, thus, not only bandwidth resources are wasted, but also existed network congestion is further aggravated.

SUMMARY OF THE INVENTION

Embodiments of the present invention provide a video communication system, device and method on the basis of feedback reference frame, so as to reduce data amount transmitted when frames are lost or decoding is failed in a video communication process.

Technical schemes provided by embodiments of the invention are implemented as follows.

A video communication method on the basis of feedback reference frame, which is applied in a system including a video encoding end and a video decoding end, the method including:

receiving, by the video encoding end, video frame information fed back by the video decoding end, determining a reference frame for encoding current video image according to the video frame information, encoding the current video image according to determined reference frame, sending a video frame formed after the encoding;

decoding, by the video decoding end, received video frame, and feeding back the video frame information to the video encoding end through a network according to decoding result.

A video communication system on the basis of feedback reference frame, in which the system includes a video encoding end, a video decoding end, a network respectively connected with the video encoding end and the video decoding end, the video encoding end at least includes a video capture module adapted to capture current video image, a video encoding module adapted to encode the current video image, and a data transmitting module adapted to send a video frame formed after encoding by the video encoding module to the video decoding end through the network, the video decoding end at least includes a video decoding module adapted to decode received video frame, the video encoding end further includes a reference frame judging module, the video decoding end further includes a feedback module;

the reference frame judging module is adapted to receive the video frame information fed back by the feedback module, and determine a reference frame for encoding the current video image according to the video frame information;

the video encoding module is adapted to encode the current video image according to the reference frame determined by the reference frame judging module;

the feedback module, which is connected with the video decoding module, is adapted to feed back the video frame information to the video encoding end through the network and according to decoding result of the video decoding module.

A video encoding communication device on the basis of feedback reference frame, which at least includes a video capture module adapted to capture current video image, a video encoding module adapted to encode the current video image, and a data transmitting module adapted to transmit a video frame formed after encoding by the video encoding module to a video decoding end through a network, the device further includes:

a reference frame judging module, which is located between the video capture module and the video encoding module, adapted to obtain video frame information fed back by the video decoding end, determine a reference frame used to encode the current video image according to the video frame information, and provide determined reference frame to the video encoding module which is adapted to execute encoding operations for the current video image.

A video decoding end device on the basis of feedback reference frame, in which the device at least includes a video decoding module adapted to decode received video frame, the device further includes:

a feedback module, which is connected with the video decoding module, adapted to feed back video frame information to a video encoding end through a network and according to decoding result of the video decoding module.

In the video communication system, device and method on the basis of feedback reference frame provided by embodiments of the invention, the feedback module at the video decoding end feeds back video frame information of the video decoding end to the video encoding end, when frames are lost or decoding is failed at the video decoding end, the video encoding end may utilize the video frame information fed back to encode an Inter frame (P frame) with high compression ratio and small data amount, and may maintain the video communication. Thus, network data flow may be reduced during the video communication process. Meanwhile, phenomenon which may cause greater impact on the network, when it is necessary to send larger data amount since frame-loss or failed-decoding, may be avoided.

EMBODIMENTS OF THE INVENTION

In a video communication system on the basis of feedback reference frame provided by embodiments of the present invention, a feedback module, which is configured to feed back video frame information of video decoding end to video encoding end, is added in the video decoding end; a reference frame judging module, which is configured to receive the video frame information fed back by the feedback module, and determine a reference frame used to encode current video image according to the video frame information, is added in the video encoding end. Thus, when frames are lost or decoding is failed at the video decoding end, operations performed by the video encoding end in the prior art to encode an Intra frame (I frame) with large data amount once again and to send the I frame to the video decoding end may be avoided. Detailed descriptions will be provided in the following.

In order to make objectives, technical solutions and advantages of the invention clearer, detailed descriptions about the invention will be provided in the following accompanying with attached figures and specific embodiments.

Figure 1:
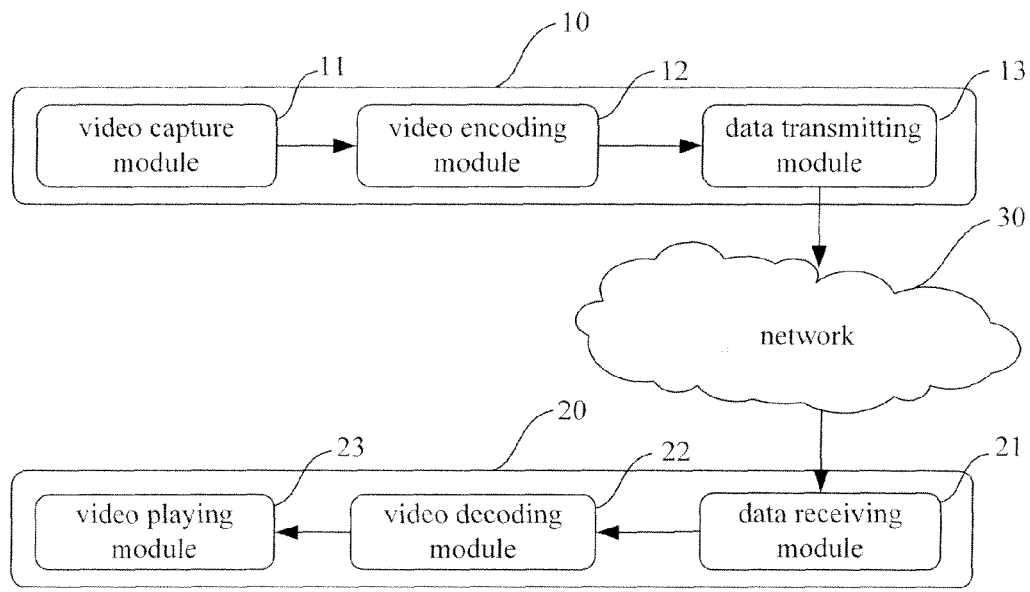
FIG. 1 is a schematic diagram illustrating structure of a system about existed video communication technologies.
Figure 2A:
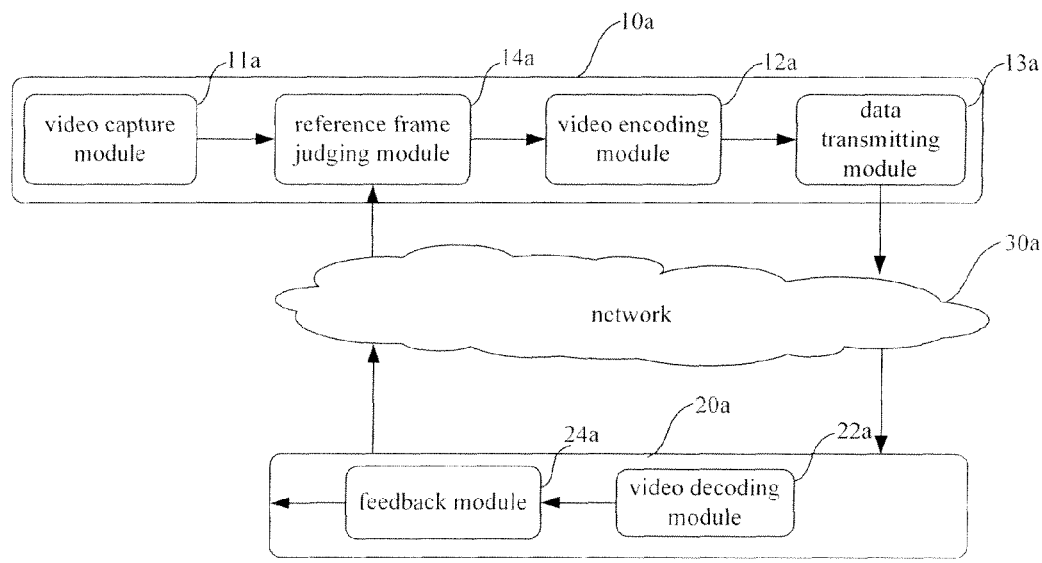
FIG. 2a is a diagram illustrating basic structure of a system in accordance with an embodiment of the invention.

With reference to FIG. 2a, FIG. 2a is a diagram illustrating basic structure of a video communication system on the basis of feedback reference frame in accordance with a first embodiment of the invention. The system includes a video encoding end 10a, a video decoding end 20a, and a network 30a which is respectively connected with video encoding end 10a and video decoding end 20a. Video encoding end 10a includes at least a video capture module 11a configured to capture current video image, a video encoding module 12a configured to encode current video image, and a data transmitting module 13a configured to transmit a video frame to video decoding end through a network, in which the video frame is formed after encoding by the video encoding module. The video decoding end includes at least a video decoding module 22a, which is configured to decode received video frames. In the embodiment of the invention, as shown in FIG. 2a, video encoding end 10a further includes a reference frame judging module 14a, video decoding end 20a further includes a feedback module 24a.

Reference frame judging module 14a receives video frame information fed back by feedback module 24a, and determines a reference frame for encoding current video image according to the video frame information.

Thus, video encoding module 12a may encode current video image according to the reference frame determined by reference frame judging module 14a, to form a video frame. And then, the video frame is sent to video decoding end 20a through network 30a. The process of video encoding module 12a encoding current video image according to the reference frame determined by reference frame judging module 14a may be implemented as follows. Video encoding module 12a encodes current video image with an inter-frame encoding mode to form a video frame (specifically is an Inter frame, P frame for short).

Feedback module 24a connecting with video decoding module 22a, is configured to feed back video frame information to video decoding end 10a according to decoding result of video decoding module 22a.

It should be explained that, connection relationships among each device in all the figures of the invention are existed for clearly clarifying information interaction and control process, thus they should be understood as logical connection relationships, instead of limiting to physical connections. Besides, it should be explained that, both video encoding end 10a and video decoding end 20a may be client and/or server end, or software run in client and/or server end. Meanwhile, roles of them are relative, which is not confined to a fixed role. As is well known by persons having ordinary skill in the art, video encoding end 10a and video decoding end 20a include physical or logical buffer, so as to facilitate storing data necessary to be buffered, e.g., to store captured video image, video frame information, encoded video frame, decoded video frame, etc.

In the foregoing, descriptions about basic structure of the video communication system provided by an embodiment of the invention were provided. In the following, descriptions about detailed structure provided by an embodiment of the invention are provided.

Figure 2B:
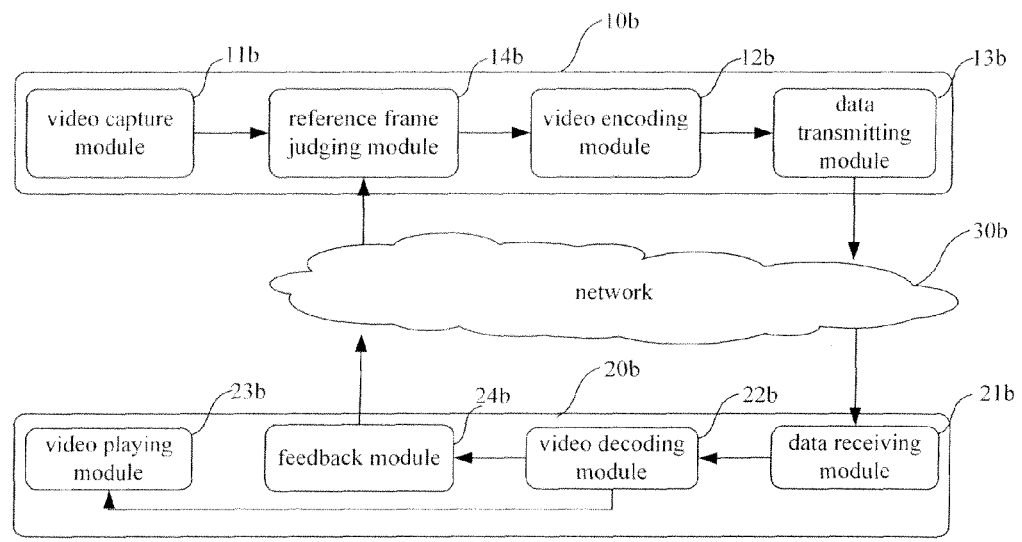
FIG. 2b is a diagram illustrating detailed structure of a system in accordance with an embodiment of the invention.

With reference to FIG. 2b, FIG. 2b is a diagram illustrating detailed structure of a video communication system on the basis of feedback reference frame in accordance with the first embodiment of the invention. As shown in FIG. 2b, the system may include a video encoding end 10b, a video decoding end 20b, and a network 30b which is respectively connected with video encoding end 10b and video decoding end 20b. Video encoding end 10b includes at least a video capture module 11b, a video encoding module 12b, a data transmitting module 13b and a reference frame judging module 14b. Video decoding end 20b may include a video decoding module 22b and a feedback module 24b. Video capture module 11b, video encoding module 12b, data transmitting module 13b, reference frame judging module 14b, video decoding module 22b and feedback module 24b are respectively similar to video capture module 11a, video encoding module 12a, data transmitting module 13a, reference frame judging module 14a, video decoding module 22a and feedback module 24a in FIG. 2a. No further descriptions will be provided here.

Preferably, reference frame judging module 14b judges whether video frame information fed back by feedback module 24b includes frame-loss information and video frame number information. If yes, operations for determining the reference frame will be executed.

When reference frame judging module 14b judging the video frame information fed back by feedback module 24b doesn't include frame-loss information and video frame number information, video encoding module 12b encodes current video image with a method, in which an I frame is encoded every 20 frames, and a P frame is encoded every 5 frames with the latest I frame as the reference frame.

When judging the video frame information fed back by feedback module 24b includes the frame-loss information and video frame number information, reference frame judging module 14b continuously judges whether there is a video frame corresponding to the video frame number information currently, if yes, takes the video frame corresponding to the video frame number information as the reference frame.

When reference frame judging module 14b judges there is no video frame corresponding to the video frame number information currently, video encoding module 12b encodes current video image in the manner of I frame.

Preferably, decoding result includes decoding success and decoding failure.

When decoding result of video decoding module 22b is decoding failure, feedback module 24b feeds back the video frame information to reference frame judging module 14b through the network.

Preferably, the video frame formed after encoding by video encoding module 12b is sent by data transmitting module 13b in the manner of video frame data to video decoding end 20b through network 30b. As shown in FIG. 2b, video decoding end 20b needs to include a data receiving module 21b connecting with video decoding module 22b, which is configured to receive video frame data transmitted by data transmitting module 13b, to package received video frame data again to form a video frame, and to send the video frame to video decoding module 22b.

In the embodiment, as shown in FIG. 2b, video decoding end 20b further includes a video playing module 23b connecting with video decoding module 22b, which is configured to play video image decoded successfully.

According to video communication technical principle, current video image is an original video image (may also be referred to as original frame), which is captured by video capture module 11b and sent to video encoding module 12b. The video frame is formed after encoding received original frames according to predetermined encoding algorithm by video encoding module 12b, the encoding mode thereof may be I frame or Inter frame (P frame for short).

The I frame refers to an encoding mode, which adopts picture compression technologies and only compresses space redundant information within the video frame. The P frame refers to another encoding mode, which not only compresses space redundant information within the video frame, but also compresses data utilizing time redundant between the video frame and a designated reference frame, that is, the P frame performs time-domain prediction and encoding, and compression efficiency of P frame is much higher than that of the I frame.

In the foregoing, the reference frame determined by reference frame judging module 14b may be utilized as a reference in subsequent video frame encoding performed by video encoding module 12b, so as to execute inter-frame encoding. Meanwhile, the reference frame may be a reconstructed frame obtained at video encoding end 10b according to the video frame information fed back. As is well known by persons having ordinary skill in the art, the reconstructed frame refers to a video frame formed after performing video encoding on an original video image, e.g., an original frame, captured by video capture module 11b, in which the video frame is a video frame with loss compared with the original frame.

Encoding mode of above reference frame may be I frame, or P frame. The reference frame may be obtained from buffer of video encoding end 10b according to the video frame information fed back by feedback module 24b, in duration between reference frame judging module 14b has completed the encoding according to a previous frame and starts to encode current video frame.

Encoding technologies of video encoding module 12b may be determined according to specific application. Video encoding technologies, such as Audio Video Interleaved (AVI), Moving Picture Experts Group (MPEG), DivX, RealVideo, Windows Media Video, Audio Video Coding Standard (AVS) or/and H.264 may be adopted. Decoding technologies of video decoding module 22b correspond to encoding technologies of video encoding module 12b. No further descriptions are provided here.

Video frame information fed back by feedback module 24b includes at least one of the follows. Information indicating whether decoding is successful, frame-loss information, video frame number information buffered, reference frame number, frame number information about the last frame buffered in video decoding end 20b.

Data transmitting module 13b and data receiving module 12b may be network transmission functional interfaces or functional modules of different user terminals. The user terminal may be computer, handheld electronic device, communication device, video monitoring device, etc. Furthermore, the user terminal may be a client run in above devices, such as an Instant Messaging (IM) end, a video communication client. The network transmission functional interface or functional module of the user terminal may be determined according to character of network 30b. Network 30b may also adopt a wired-based network, such as Internet wired network, digital television network. Network 30b may also adopt a wireless-based network, such as General Packet Radio Service (GPRS), Code Division Multiple Access (CDMA), Time Division Switching-CDMA (TDS-CDMA), Wireless Fidelity (WiFi), or a wireless network based on IEEE 802.11x series.

Figure 2C:
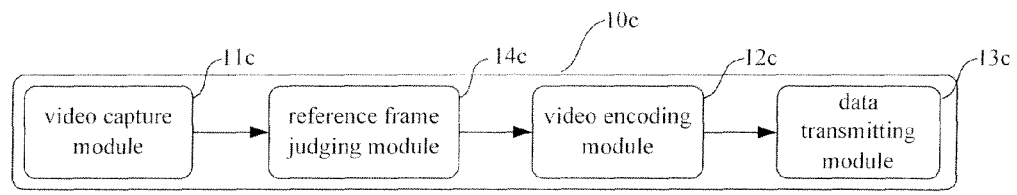
FIG. 2c is a diagram illustrating structure of an encoding end device in accordance with an embodiment of the invention.

In the foregoing, detailed descriptions about the system provided by an embodiment of the invention were provided. Preferably, embodiments of the present invention also provide a video encoding communication device on the basis of feedback reference frame correspondingly. With reference to FIG. 2c, FIG. 2c is a diagram illustrating structure of a video encoding communication device on the basis of feedback reference frame provided by an embodiment of the invention. As shown in FIG. 2c, the device at least includes a video capture module 11c configured to capture current video image, a video encoding module 12c configured to encode current video image, and a data transmitting module 13c configured to transmit a video frame formed after encoding by video encoding module 12c to video decoding end through the network. Preferably, the device further includes the follows.

A reference frame judging module 14c, which is located between video capture module 11c and video encoding module 12c, is configured to obtain video frame information fed back by video decoding end, determine a reference frame used to encode current video image according to the video frame information, and provide the determined reference frame, which is used to perform encoding operations on current video image, to video encoding module 12c.

Preferably, in the embodiment of the invention, there may be multiple implementation modes for reference frame judging module 14c. As shown in FIG. 2c, reference frame judging module 14c includes the follows.

A first judging unit 11d, configured to judge whether the video frame information fed back by video decoding end includes frame-loss information and video frame number information.

A first determining unit 12d, when judging result of first judging unit 11d is yes, configured to determine a reference frame which is used to encode current video image.

When judging result of first judging unit 11d is no, video encoding module 12c encodes current video image according to a predetermined encoding method. The predetermined encoding method refers to encoding an I frame every 20 frames, and encoding a P frame every 5 frames with the latest I frame as a reference frame.

Figure 2D:
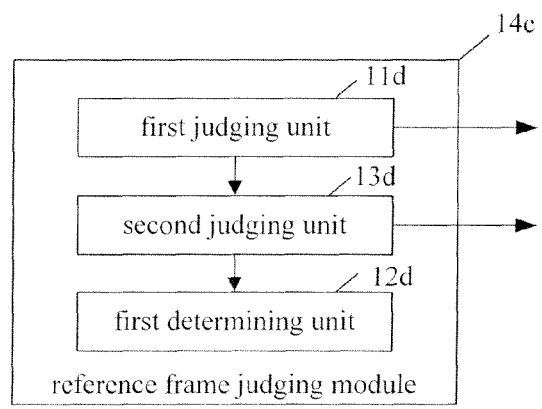
FIG. 2d is a diagram illustrating structure of a reference-frame feedback module in an encoding end device in accordance with an embodiment of the invention.

Preferably, as shown in FIG. 2d, reference frame judging module 14c further includes the follows.

A second judging unit 13d, which is located between first judging unit 11d and first determining unit 12d, when judging result of first judging unit is yes, configured to judge whether there is a video frame corresponding to the video frame number.

When judging result of second judging unit 13d is yes, first determining unit 12d is configured to take the video frame corresponding to the video frame number as a reference frame, Thus, when judging result of second judging unit 13d is no, video encoding module 12c may encode current video image to form a video frame in the manner of I frame.

Until now, descriptions about structure of a video encoding communication device on the basis of feedback reference frame are provided.

Figure 2E:
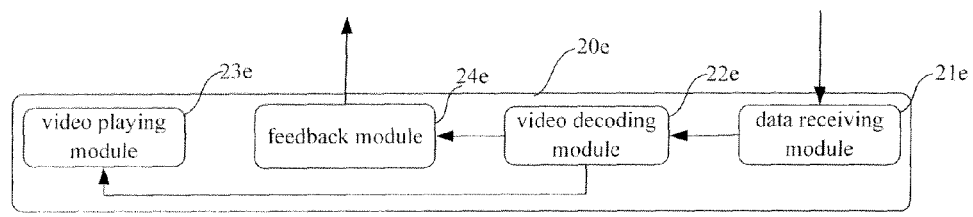
FIG. 2e is a diagram illustrating structure of a decoding end device in accordance with an embodiment of the invention.

Preferably, embodiments of the invention also provide a video decoding communication device on the basis of feedback reference frame correspondingly. As shown in FIG. 2e, the device at least includes a video decoding module 22e configured to decode received video frames. The key is that the device further includes the follows.

Feedback module 24e, which is connected with video decoding module 22e, is configured to feed back video frame information to video encoding end through the network according to decoding result of video decoding module.

The decoding result includes decoding success and decoding failure.

When decoding result is decoding failure, feedback module 24e is configured to feed back video frame information to video encoding end through the network. When the video frame with failed decoding is a backbone frame, the video frame information carries frame number information about the last frame buffered currently.

When implementing specifically, the device further includes the follows.

A data receiving module 21e, which is connected with video decoding module 22e, is configured to receive video frame data transmitted by video encoding end, package the video frame data to form a video frame again, and provide the video frame to video decoding module 22e.

Video playing module 23e, configured to play video image decoded successfully, when decoding result of video decoding module 22e is decoding success.

Until now, descriptions about structure of a video decoding communication device on the basis of feedback reference frame are provided.

To make embodiments of the invention more clear, descriptions about flow provided by embodiments of the invention are given.

Figure 3:
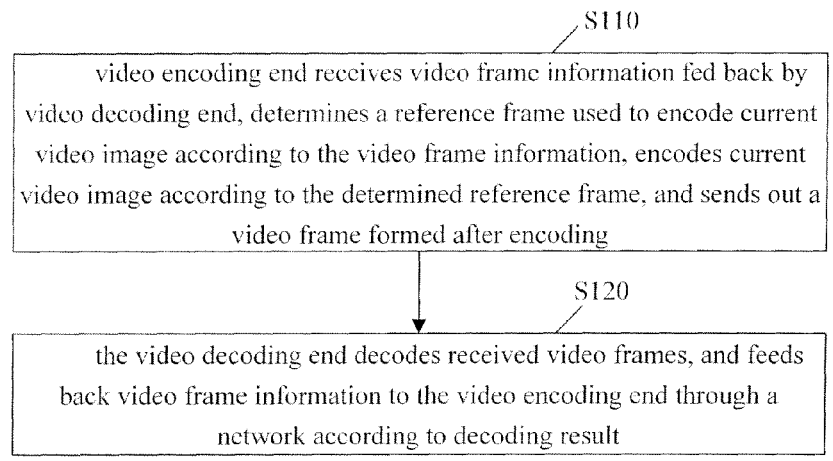
FIG. 3 is a schematic diagram illustrating a brief flow in accordance with an embodiment of the invention.

With reference to FIG. 3, FIG. 3 is a diagram illustrating a basic flow on the basis of FIG. 2a or FIG. 2b in accordance with embodiments of the invention. As shown in FIG. 3, the flow may include the following steps.

Step S110, video encoding end receives video frame information fed back by video decoding end, determines a reference frame used to encode current video image according to the video frame information, encodes current video image according to the determined reference frame, and sends out a video frame formed after encoding.

Step S120, video decoding end decodes received video frames, and feeds back video frame information to the video encoding end through a network according to decoding result.

It can be seen that, step S110 actually demonstrates operations about video encoding communication on the basis of feedback reference frame provided by an embodiment of the invention, while step S120 demonstrates operations about video decoding communication on the basis of feedback reference frame provided by an embodiment of the invention. To make the embodiment clearer, descriptions about steps S110 and S120 are respectively provided in the following.

Figure 4:
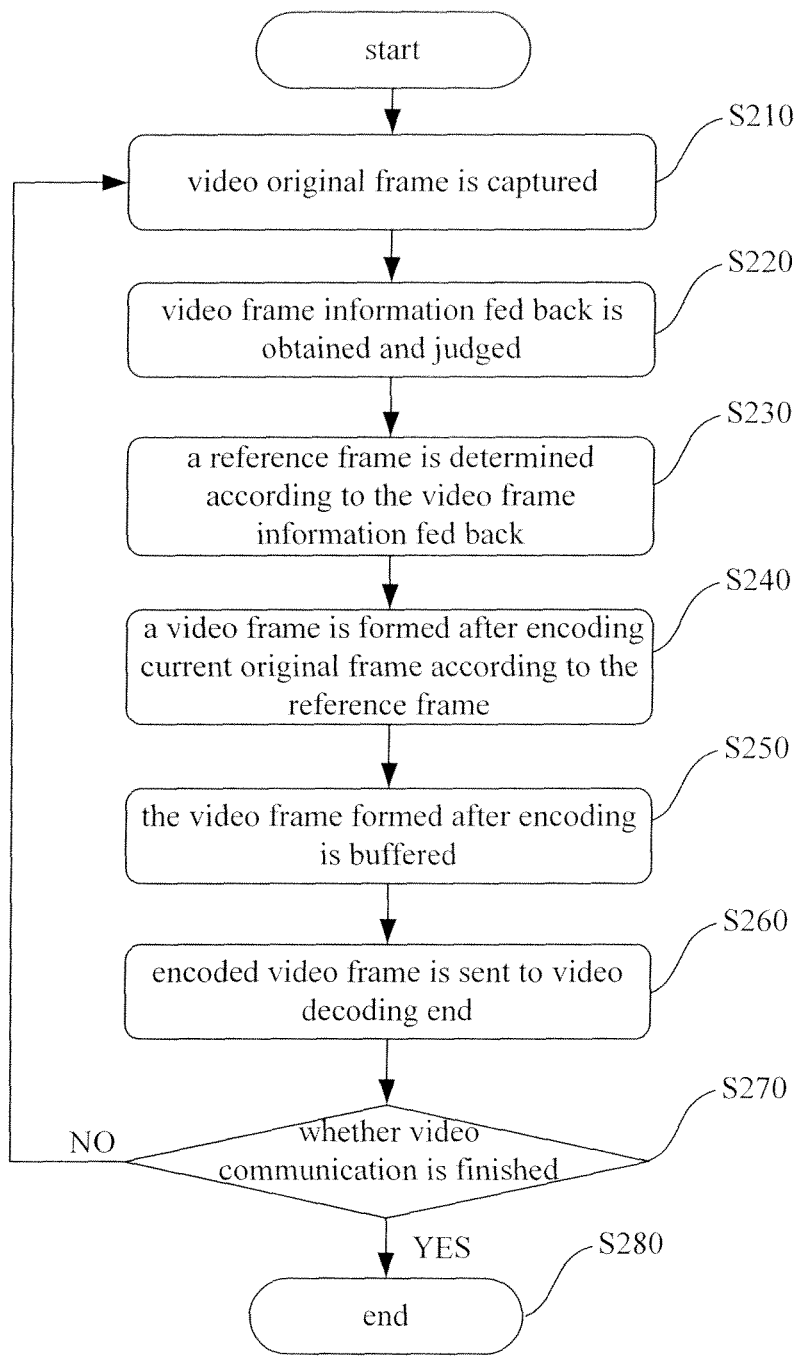
FIG. 4 is a diagram illustrating detailed flow about encoding communication in accordance with an embodiment of the invention.

With reference to FIG. 4, FIG. 4 is a diagram illustrating flow about video encoding communication on the basis of feedback reference frame in accordance with an embodiment of the invention, which is the detailed description in step S110. Meanwhile, the flow may be on the basis of structure illustrated in FIG. 2c. As shown in FIG. 4, the flow may include the follows.

Step S210, video encoding end captures original frames of video image.

Step S220, video frame information fed back is obtained and judged.

Step S230, a reference frame is determined according to the video frame information fed back;

Step S240, a video frame is formed after encoding current original frame according to the reference frame;

Step S250, the video frame formed after encoding is buffered;

Step S260, encoded video frame is sent to video decoding end;

Step S270, whether it is necessary to finish video communication is determined, if the video communication is continued, block 210 will be executed; otherwise, the video communication will be finished.

The reference frame in step S230 may be utilized as a reference to execute inter-frame encoding, when video encoding module 12c performing subsequent encoding for video frames. Meanwhile, the reference frame in step S230 may be a reconstructed frame obtained at the video encoding end according to the video frame information fed back. Specifically, a reconstructed frame refers to a video frame formed after performing video encoding on an original video image, e.g., an original frame, captured by video capture module 11c, in which the video frame carries loss compared with the original frame.

Encoding mode of the reference frame may be I frame, or P frame. The reference frame may be obtained from buffer of the video encoding end according to the video frame information fed back, in duration between reference frame judging module 14c has completed the encoding according to a previous video frame and starts to encode current video frame.

Specifically, the video frame information includes at least one of the following. Information indicating whether decoding is successful, frame-loss information, video frame number information buffered, reference frame number, frame number information about the last frame buffered in video decoding end.

The step of obtaining and judging video frame information fed back in step S220 includes the follows.

Step S221, whether the video frame information fed back includes frame-loss information and video frame number information is determined. If yes, step S230 will be executed. Otherwise, step S222 will be executed.

Step S222, the video frame is encoded according to a predetermined encoding method. The predetermined encoding method refers to encoding an I frame every 20 frames, and encoding a P frame every 5 frames with the latest I frame as a reference frame. According to requirements of practical application, the predetermined encoding method may refer to an encoding rule, which encodes an I frame every A frames, and encodes a P frame every B frames with the latest I frame as a reference frame. A and B may be arbitrary numbers.

Step for determining the reference frame according to the video frame information fed back in step S230 may include the follows.

Step S231, whether there is a video frame corresponding to buffered video frame number in a buffer of video encoding end, if yes, step S232 will be executed; otherwise, step S233 will be executed.

Step S232, the video frame corresponding to the buffered video frame number is taken as a reference frame;

Step S233, a video frame is formed by encoding current original frame in the manner of I frame, and step S260 may be directly executed.

Step for buffering a video frame formed after encoding in step S250 includes the follows.

Step S251, number of a video frame formed after encoding is judged.

Step S252, a video frame corresponding to the video frame number is buffered according to a rule for buffering video frames.

The rule for buffering video frames refers to that, if number of a video frame formed after encoding is multiple of a certain number, the video frame will be buffered; otherwise, the video frame will not be buffered. The certain number above in the rule may be numbers, such as 2, 3, 5 and 8. The above buffered video frame is stored in a buffer. The buffer may accommodate a predetermined number of this video frame, e.g., N video frames. The predetermined number N may be defined according to actual requirements, e.g., 5 reconstructed frames encoded, but not limited to this size. Meanwhile, buffered space may be adjusted, e.g., a video frame buffered earliest may be removed when the buffer is full. Specifically, according to principle of accommodating N video frames by the buffer, a video frame buffered earliest may be removed from the video frames buffered currently, and then, N video frames may be buffered, in which N is a predetermined number.

Until now, the flow about a video decoding communication method on the basis of feedback reference frame provided by an embodiment of the invention may be implemented.

Figure 5:
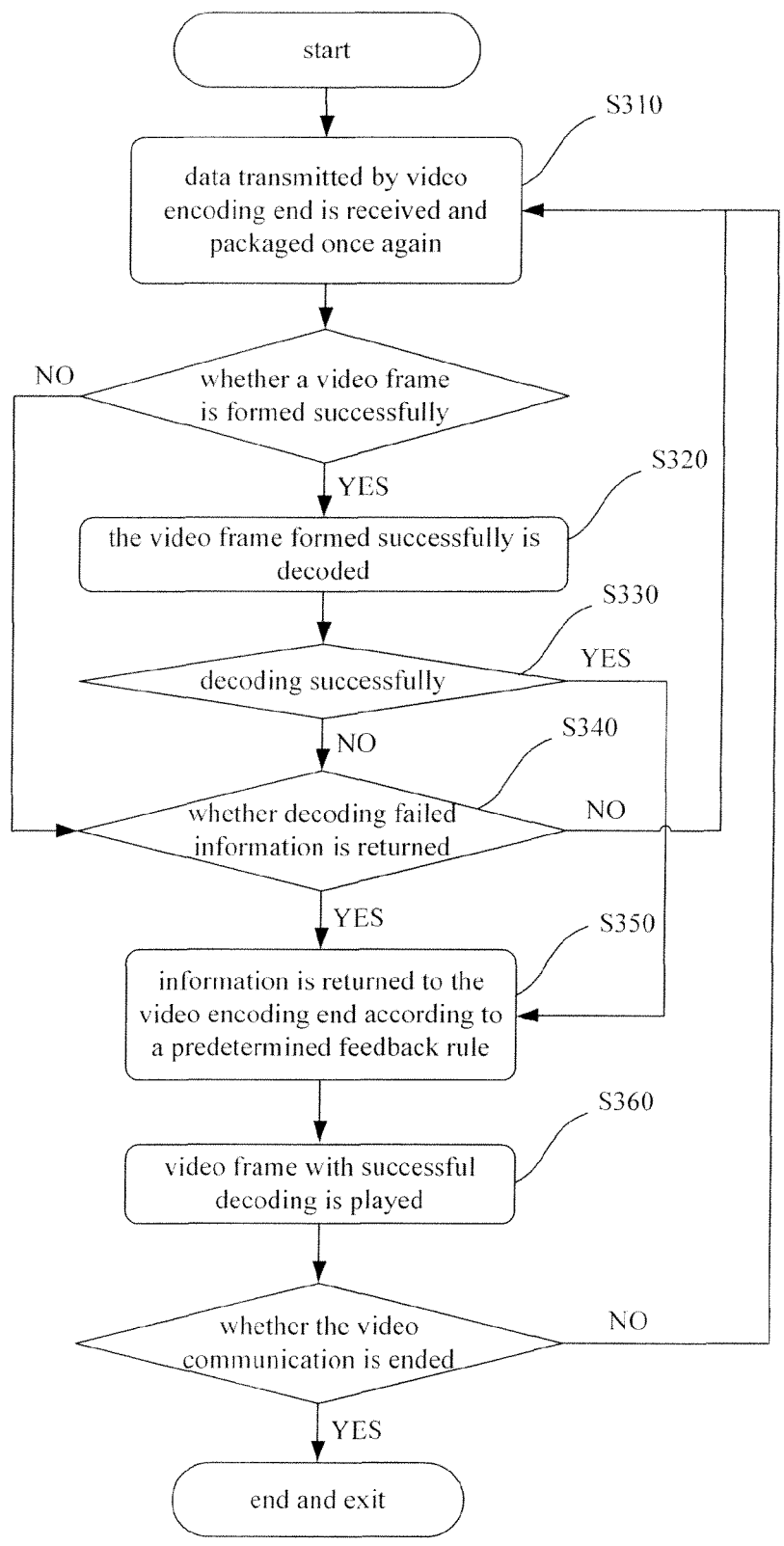
FIG. 5 is a diagram illustrating detailed flow about decoding communication in accordance with an embodiment of the invention.

With reference to FIG. 5, FIG. 5 is a diagram illustrating a flow about video decoding communication on the basis of feedback reference frame in accordance with a third embodiment which is provided based on the first embodiment of the invention. FIG. 5 illustrates the detailed descriptions in step S120. The flow in FIG. 5 may be on the basis of structure shown in FIG. 2e. As shown in FIG. 5, the flow may include the following.

Step S310, video decoding end receives video frame data transmitted by video encoding end, and packages the video frame data to form a video frame again. If the video frame data has been packaged successfully, step S320 will be executed; otherwise, decoding failed information will be returned.

Step S320, the video frame with newly and successful package may be decoded.

Step S330, whether decoding is successful may be judged, if the decoding is successful, step S360 will be executed; otherwise, step S340 will be executed.

Step S340, whether it is necessary to feed back video frame information to video encoding end may be judged, if yes, step S350 will be executed; otherwise, step S310 will be executed.

Step S350, the video frame information is fed back to the video encoding end according to a predetermined feedback rule.

Step S360, the video frame with successful decoding may be played; during the process of playing the video frame with successful decoding, if it is necessary to finish the video communication, the flow will be finished and exited. Otherwise, step S310 will be returned.

The step for feeding back the video frame information to the video encoding end according to a predetermined feedback rule in step S350 may include the follows.

Step S351, whether decoded video frame has already been buffered in the video encoding end may be judged, if yes, step S352 will be executed; otherwise, step S353 will be executed.

When sending the video frame by the video encoding end, if the video frame has also been buffered currently, an identifier indicating the video frame has been buffered currently will be made for this video frame to be sent out. Thus, when step S351 being executed, whether the decoded video frame has already been buffered in the video encoding end may be directly judged according to whether the decoded video frame has the identifier. Of course, other operation modes may also be adopted in the embodiment of the invention to facilitate the video decoding end to judge whether the decoded video frame has already been buffered in the video encoding end, which is not specifically limited in the embodiment of the invention.

Step S352, the decoded video frame is stored in a buffer of video decoding end 20, and then, step S353 will be executed.

Step S353, whether it is necessary to feed back video frame information through a network may be judged according to a predetermined rule, if yes, the video frame information will be fed back, otherwise, no video frame information will be fed back.

Specifically, the predetermined rule refers to all the decoding successful information will not be fed back, that is, only when the decoding is failed, video frame information will be fed back in the embodiment, Failed decoding is specifically as follows. For example, video frames with continuous frame numbers are not obtained in a predetermined duration, which is not limited here.

The video frame information fed back includes one of the follows. Successful information, frame-loss information, video frame number information buffered, reference frame number, frame number information about the last frame in the buffer of the video decoding end. When the frame number information about the last frame is included, it means that the video frame with unsuccessful decoding is a backbone frame. Here, the backbone frame refers to a video frame, when decoding of the video frame is failed, all of the subsequent frames except for the I frame cannot be decoded correctly. That is, the backbone frame refers to a video frame, which may be decoded separately independent of several proximate video frames in front of it. The several proximate video frames may be one frame proximate with the backbone frame, or may be multiple frames proximate with the backbone frame.

The technical scheme provided by embodiments of the invention may be applied in video communication service technologies with feedback channels, e.g., network video playing, video chatting, video conference, video monitoring and Video On Demand (VOD).

The foregoing is only preferred embodiments of the invention, which is not used to limit the scope of the invention. Any equivalent structure substitution or flow substitution made utilizing contents of the specification and attached figures in the invention, or applied directly or indirectly in other related technical fields, should be covered by the protection scope of the invention similarly.

The invention claimed is:

1. A video communication method on the basis of feedback reference frame, which is applied in a system comprising a video encoding end and a video decoding end, the method comprising:
   receiving, by the video encoding end, video frame information fed back by the video decoding end, determining a reference frame for encoding current video image according to the video frame information, encoding the current video image according to determined reference frame, sending a video frame formed after the encoding;
   decoding, by the video decoding end, received video frame, and feeding back the video frame information to the video encoding end through a network according to decoding result; and
   wherein determining the reference frame comprises
   determining whether the video frame information fed back by the video decoding end comprises frame-loss information and video frame number information, if the video frame information fed back by the video decoding end comprises the frame-loss information and the video frame number information, determining the reference frame;
   wherein when determining the video frame information fed back by the video decoding end comprises the frame-loss information and the video frame number information, determining the reference frame comprises
   determining whether there is a video frame buffered at the video encoding end corresponding to the video frame number currently, if there is a video frame corresponding to the video frame number currently, taking the video frame corresponding to the video frame number as the reference frame, and
   when determining there is no video frame buffered at the video encoding end corresponding to the video frame number, encoding the current video image in the manner of Intra frame (I frame) to form the video frame;
   wherein the video frame number is a video frame number of a buffered video frame, a video frame number of a reference frame, or a video frame number of the last frame in the buffer of the video decoding end;
   if the video frame information fed back by the video decoding end does not comprise the frame-loss information and the video frame number information, encoding the current video image according to a predetermined encoding method, in which an intra frame (I frame) is encoded every m frames and an inter frame (P frame) is encoded every n frames with the latest I frame as the reference frame, wherein m and n are predetermined; and
   buffering video frames with frame number following a predetermined rule at the video encoding end.

2. The video communication method on the basis of feedback reference frame according to claim 1, wherein when determining the video frame information fed back by the video decoding end does not comprise the frame-loss information and the video frame number information, a predetermined encoding method is provided to the video encoding end; and
   the predetermined encoding method refers to encoding an Intra frame (I frame) every 20 frames, and encoding an Inter frame (P frame) every 5 frames with the latest I frame as the reference frame.

3. The video communication method on the basis of feedback reference frame according to claim 1, wherein
   when the video frame is formed after encoding the current video image, whether it is necessary to buffer the video frame currently is determined according to the video frame number, if yes, N video frames are buffered, in which N is a predetermined number.

4. The video communication method on the basis of feedback reference frame according to claim 3, wherein buffering N video frames comprises:
   when current buffer space is full, removing a video frame buffered earliest from video frames currently buffered according to a principle of accommodating N video frames by the buffer space, in which N is a predetermined number, and
   buffering the N video frames.

5. The video communication method on the basis of feedback reference frame according to claim 1, wherein the decoding result comprises decoding success and decoding failure; and
   when the decoding result is decoding failure, feeding back, by the video decoding end, the video frame information to the video encoding end through the network.

6. The video communication method on the basis of feedback reference frame according to claim 5, wherein when the decoding result at the video decoding end is decoding failure and determining the received video frame is a backbone frame, the video frame number information comprised in the video frame information fed back comprises frame number information about the last frame buffered in the video decoding end.

7. A video communication system on the basis of feedback reference frame, wherein the system comprises a video encoding end, a video decoding end, a network respectively connected with the video encoding end and the video decoding end, the video encoding end at least comprises a video capture module adapted to capture current video image, a video encoding module adapted to encode the current video image, and a data transmitting module adapted to send a video frame formed after encoding by the video encoding module to the video decoding end through the network, the video decoding end at least comprises a video decoding module adapted to decode received video frame, the video encoding end further comprises a reference frame judging module, the video decoding end further comprises a feedback module;
   the reference frame judging module is adapted to receive the video frame information fed back by the feedback module, and determine a reference frame for encoding the current video image according to the video frame information;
   the video encoding module is adapted to encode the current video image according to the reference frame determined by the reference frame judging module;
   the feedback module, which is connected with the video decoding module, is adapted to feed back the video frame information to the video encoding end through the network and according to decoding result of the video decoding module;

wherein the reference frame judging module is adapted to judge whether the video frame information fed back by the feedback module comprises frame-loss information and video frame number information, if the video frame information fed back by the feedback module comprises the frame-loss information and the video frame number information, determine the reference frame;

when the reference frame judging module judging the video frame information fed back by the feedback module doesn't comprise the frame-loss information and the video frame number information, the video encoding module is adapted to encode the current video image with a method, in which an Intra frame (I frame) is encoded every m frames, and an Inter frame (P frame) is encoded every n frames with the latest I frame as the reference frame; wherein m and n are predetermined;

wherein when judging that the video frame information fed back by the feedback module comprises the frame-loss information and the video frame number information, the reference frame judging module is further adapted to judge whether there is a video frame corresponding to the video frame information, when there is a video frame corresponding to the video frame information, take the video frame corresponding to the video frame number information as the reference frame;

when the reference frame judging module judging that there is no video frame corresponding to the video frame number, the video encoding module is further adapted to encode the current video image in the manner of Intra frame (I frame) to form the video frame;

wherein the video frame number is a video frame number of a buffered video frame, a video frame number of a reference frame, or a video frame number of the last frame in the buffer of the video decoding end; and buffering video frames with frame number following a predetermined rule at the video encoding end.

8. The video communication system on the basis of feedback reference frame according to claim 7, wherein the decoding result comprises decoding success and decoding failure;

when the decoding result of the video decoding module is decoding failure, the feedback module is adapted to feed back the video frame information to the reference frame judging module through the network.

9. The video communication system on the basis of feedback reference frame according to claim 8, wherein the video decoding end further comprises:

a data receiving module, which is connected with the video decoding end, adapted to receive the video frame sent by the video encoding end, and send the received video frame to the video decoding module; and a video playing module, when the decoding result of the video decoding module is decoding success, adapted to play the video image decoded successfully.

10. A video encoding communication device on the basis of feedback reference frame, which at least comprises a video capture module adapted to capture current video image, a video encoding module adapted to encode the current video image, and a data transmitting module adapted to transmit a video frame formed after encoding by the video encoding module to a video decoding end through a network, the device further comprises:

a reference frame judging module, which is located between the video capture module and the video encoding module, adapted to obtain video frame information fed back by the video decoding end, determine a reference frame used to encode the current video image according to the video frame information, and provide determined reference frame to the video encoding module which is adapted to execute encoding operations for the current video image;

wherein the reference frame judging module comprises, a first judging unit adapted to judge whether the video frame information fed back by the video decoding end comprises frame-loss information and video frame number information, and a first determining unit, when the first judging unit judging the video frame information fed back by the video decoding end comprises the frame-loss information and the video frame number information, adapted to determine the reference frame used to encode the current video image;

wherein the video encoding module, when the first judging unit judging the video frame information fed back by the video decoding end does not comprise the frame-loss information and the video frame number information, adapted to encode the current video image according to a predetermined encoding method, in which the predetermined encoding method refers to encoding an Intra frame (I frame) every m frames, and encoding an Inter frame (P frame) every n frames with the latest I frame as the reference frame; wherein m and n are predetermined;

wherein the reference frame judging module further comprises a second judging unit, which is located between the first judging unit and the first determining unit, when the first judging unit judging the video frame information fed back by the video decoding end comprises the frame-loss information and the video frame number information, adapted to judge whether there is a video frame corresponding to the video frame number currently, when the second judging unit judging there is a video frame corresponding to the video frame number currently, the first determining unit is adapted to take the video frame corresponding to the video frame number as the reference frame, and when the second judging unit judging there is no video frame corresponding to the video frame number currently, the video encoding module is adapted to encode the current video image in the manner of Intra frame (I frame) to form the video frame;

wherein the video frame number is a video frame number of a buffered video frame, a video frame number of a reference frame, or a video frame number of the last frame in the buffer of the video decoding end; and buffering video frames with frame number following a predetermined rule at the video encoding end.

* * * * *

UNITED STATES PATENT AND TRADEMARK OFFICE
CERTIFICATE OF CORRECTION

PATENT NO. : 8,971,415 B2  
APPLICATION NO. : 12/966473  
DATED : March 3, 2015  
INVENTOR(S) : Jian He Page 1 of 1

It is certified that error appears in the above-identified patent and that said Letters Patent is hereby corrected as shown below:

On the title page, item (75)

Jian Hi, Shenzhen (CN) should read:
Jian He, Shenzhen (CN)

Signed and Sealed this
Seventeenth Day of November, 2015

Michelle K. Lee
*Director of the United States Patent and Trademark Office*